United States Patent [19]
Grlj et al.

[11] Patent Number: 5,113,698
[45] Date of Patent: May 19, 1992

[54] VIBRATING BEAM TRANSDUCER DRIVE SYSTEM

[75] Inventors: Steven F. Grlj, Bellevue; Craig J. Cornelius, Redmond, both of Wash.

[73] Assignee: Sundstrand Data Control, Inc., Redmond, Wash.

[21] Appl. No.: 485,188

[22] Filed: Feb. 26, 1990

[51] Int. Cl.⁵ .............................................. G01L 1/10
[52] U.S. Cl. ........................ 73/862.59; 73/517 AV
[58] Field of Search ...... 73/862.59, 517 AV, DIG. 1, 73/704

[56] References Cited
U.S. PATENT DOCUMENTS
4,299,122  11/1981  Ueda et al. ...................... 73/862.59

Primary Examiner—John E. Chapman
Attorney, Agent, or Firm—Michael S. Yatsko

[57] ABSTRACT

A drive system for providing different excitation voltages to the separate beams of a multiple beam vibrating transducer is disclosed. In one embodiment of the invention an amplified voltage at the resonant frequency of a master beam is amplified and applied to a secondary beam, to force the secondary beam to vibrate at the resonant frequency and amplitude of the master beam to force the transducer to resonate at the frequency of the master beam. Since the transducer vibrates at the resonant frequency of one of the beams, the transducer energy losses to the adjacent mounting structure are reduced. This results in a higher transducer quality factor so that frequency shifts in the resonant frequency can be readily measured as changes in the parameter that the transducer is intended to monitor.

15 Claims, 2 Drawing Sheets

VIBRATING BEAM TRANSDUCER DRIVE SYSTEM

FIELD OF THE INVENTION

This invention relates to vibrating beam transducers and, more specifically, to a drive system for individually exciting the separate beams of multiple beam vibrating transducers.

BACKGROUND OF THE INVENTION

Vibrating beam transducers are frequently used in modern sensors to provide an electrical signal representative of the force applied to the sensor. Vibrating beam transducers may be formed out of piezoelectric material, material that, when a signal is applied, develops a stress, and, conversely, when a stress is applied to the material, a voltage develops on the surface of the material. A vibrating beam transducer has a resonant frequency at which cyclical stressing results in a peak admittance and a minimum impedance to signals applied to the transducer. In some vibrating beam transducers, the resonant frequency of the transducer changes in proportion to the force-induced stress to which the beam is subjected. Force-measuring sensors that employ vibrating beam transducers operate by applying a voltage to the transducer which is used to establish the resonant frequency of the transducer that, in turn, is measured as an indication of the force applied to the transducer. Vibrating beam transducers that measure force are frequently employed in sensors used to measure weight, pressure and acceleration, since each of these parameters can be measured as a function of applied force.

Most piezoelectric vibrating beam transducers are formed from crystalline quartz which has piezoelectric properties that are well suited to force measurement. A vibrating beam transducer is typically in the form of a double-ended tuning fork with two beams secured together at their ends by integral mounting pads. The beams of the tuning fork are the actual vibrating beams. Electrodes on the beams (or on at least one of the mounting pads) provide the necessary signal to excite the beams into resonant vibration. In the preferred operating mode of many vibrating transducers, when a signal is applied to the beams, the individual beams vibrate 180° out of phase with each other. When the beams so vibrate, they are referred to as being mechanically in phase with each other in a common plane. When the beams vibrate in phase, the force and torque end reactions of one beam are cancelled by the equal and opposite reactions of the other beam, minimizing the energy transfer between the mounting surface and the transducer and the support structures to which it is attached.

In an ideal vibrating beam transducer, at the resonant frequency, no mechanical energy should be transmitted from the transducer to the support structure. The removal of energy at the resonant frequency of the transformer lowers the quality factor of the transducer which is a measure of the ability of the transducer to resonate at a precisely defined frequency. A transducer with a lower quality factor provides output signals that are less precise measurements of force applied to the transducer.

One cause of energy transfer in many vibrating beam transducers is that the beams do not have identical resonant frequencies. Different isolated resonant frequencies in the individual beams can be attributed to the slight, but inevitable, variations in individual tine shape and dimensions. Still another cause of some differences in resonant frequencies of the beams is asymmetry in the facets where the beams join the mounting pads are asymmetric which results in the tines having different bending stiffnesses. Consequently, because of these differences, the two individual beams, even though formed out of a single piece of quartz, often have slightly different separate, or isolated, natural resonant frequencies. Thus, when an oscillating voltage is applied to the beams, the resultant resonant frequency of the transducer as a whole is at an intermediate frequency between the isolated resonant frequencies of the individual beams. As a result, the beams do not vibrate in phase or with equal amplitudes so that the force and torque end reactions of beams do not cancel each other. Consequently, there is a loss of energy to the surrounding support structure and a subsequent reduction in the quality factor of the transducer.

There have been some attempts to modify transducer beams so that both beams resonate at the same frequency by placing trim masses on the beams in an effort to reduce the frequency differences and cause an increase in the overall quality factor of the transducer. In practice, trim masses are often made part of each beam by initially placing a base mass on each of the beams as part of the manufacturing process. The base masses are then selectively trimmed off one or both of the beams to form the trim masses, until testing indicates that both beams vibrate at the same frequency as indicated by an improved quality factor for the transducer. However, there are several limitations associated with adding trim masses to reduce the effects of the differences in the resonant frequencies of the beams. In many instances, the asymmetries between the beams only become apparent after the transducer is mounted to the device with which it is to be used. Selective trimming of the masses on the transducer, after it has been mounted is often very difficult, if not impossible, because the position of the transducer in the device makes it very impractical to selectively pare away portions of the masses by laser cutting or any other means.

Moreover, for many beam transducers used for force measurement, adding trim masses does not completely eliminate the resonant frequency differences and amplitude differences between the beams. This is because the trim masses can only be added to the beams to adjust for frequency differences between the beams forming the transducer at one specific resonant frequency. The resonant frequencies of the individual beams forming the transducer change as strain is applied to the transducer. Thus, when force is applied to a transducer during the transducer sensing process, when it is most desirable to maintain the high quality factor of the transducer, trim masses are not completely effective for equalizing the inherent resonant frequencies and amplitudes of the beams so that the quality factor of the transducer does not appreciably degrade.

SUMMARY OF THE INVENTION

This invention comprises providing a drive system for a multiple beam transducer that provides a different drive signal to each beam. The drive signals cause the beams to vibrate at a common amplitude and phase, and at a common frequency that is closer to the isolated resonant frequency of one of the beams than to the intermediate frequency at which the beams would vibrate if a common drive signal was applied to the beams. Since the beams vibrate at a frequency near the resonant frequency of one of the beams, and since the vibrations are at the same amplitude and are in phase, energy transfer to and from the transducer to the transducer support structure is minimized. The reduction in energy loss increases the quality factor of the transducer and thus enhances the accuracy of the transducer as a force measurement sensor. A preferred drive system of this invention operates by using the resonant frequency of one beam, the master beam, to control the voltage applied to the other beam, the secondary beam, so that the secondary beam vibrates at the resonant frequency and amplitude of the master beam and is in mechanical phase therewith.

In one embodiment of this invention, the drive system operates by applying a drive voltage to the secondary beam, at the resonant frequency of the master beam, that is greater than the drive voltage applied to the master beam. The relatively high drive voltage applied to the secondary beam causes the beam to vibrate at a frequency above its natural isolated resonate frequency. Specifically, the relatively high voltage causes vibrations in the secondary beam that are in phase with and have the same amplitude as the vibrations of the master beam. The force and torque end reactions of the secondary beam will thus cancel the equal and opposite reactions of the master beam, thereby significantly reducing energy loss to the surrounding mounting structure.

Since energy lost during the vibration of the beams is reduced, the quality factor of the transducer noticeably improves and the accuracy of force measurements made as a function of stress-induced frequency changes are increased.

BRIEF DESCRIPTION OF THE DRAWINGS

The invention will be pointed out with particularity in the appended claims. The above and further advantages of the invention may be better understood by referring to the following detailed description taken in conjunction with the accompanying drawings, in which:

DETAILED DESCRIPTION OF THE INVENTION

Figure 1:
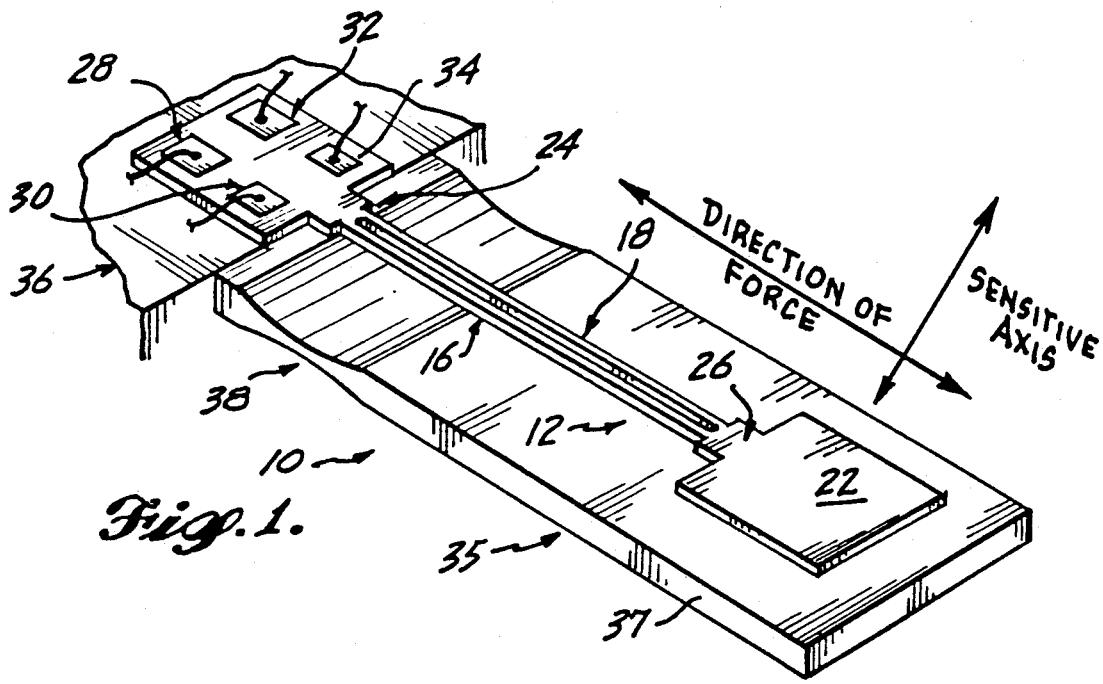
FIG. 1 is a perspective view of a double ended tuning fork type beam transducer mounted to a proof mass assembly.

FIG. 1 illustrates a basic force measuring sensor 10 comprising a double ended, crystal tuning fork transducer 12. A drive system 40, described hereinafter, is used to apply drive signals to the transducer 12. The transducer 12 and the drive system 40 form an oscillator 42 that generates an output signal having a frequency that varies with changes in the mechanical resonant frequency of the transducer.

Depicted transducer 12 is a type of transducer normally used to measure acceleration as a function of acceleration-induced force applied thereto. The transducer 12 comprises two spaced-apart beams 16 and 18 which are integrally joined at both ends to mounting pads 20 and 22 respectively. The beams 16 and 18 are secured to small outrigger sections 24 and 26 on the mounting pads 20 and 22 respectively, so as to attenuate the energy transfer from the beams to the mounting pads. Drive signals are applied to the transducer 12 through electrodes 28-34 on mounting pad 20. In the depicted embodiment, electrodes 28 and 30 used to apply a drive signal to beam 16 and electrodes 32 and 34 are used to apply a drive signal to beam 18.

Transducer 12 is attached at opposite ends to a support structure 35. Support structure 35 includes a base assembly 36 firmly secured to the body to which the sensor 10 is attached. The support structure 35 also includes a proof mass 37 hingedly attached to the base assembly 36 by a flexure 38. Transducer 12 is secured to support structure 35 across flexure 38. When sensor 10 is subjected to acceleration in the axis perpendicular to the longitudinal axis of the transducer 12, and perpendicular to the axis of the flexure 38, the proof mass 37 rotates about the flexure axis. The rotation of the proof mass 37 imposes either a compressing or tensing force on the longitudinal axis of the transducer 12. This force, in turn, causes a change in the mechanical resonant frequency of the transducer 12. Changes in the resonant frequency of the transducer 12 change the frequency of the output signal from the transducer 12-drive system 40 oscillator which is representative of the acceleration-induced force applied to the sensor 10.

Figure 2:
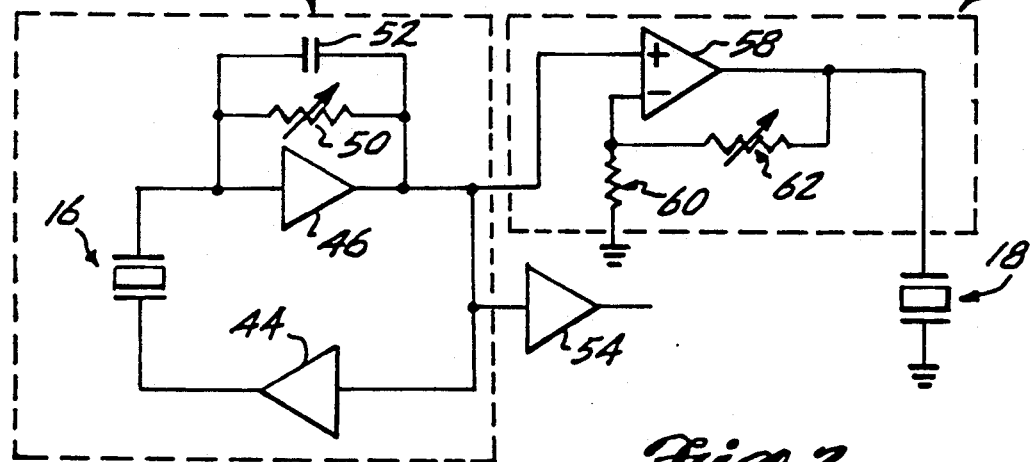
FIG. 2 is a schematic diagram depicting a drive circuit using the resonance of a master beam of the transducer of FIG. 1 to control the application of a drive voltage to a secondary beam.

With reference to FIG. 2, the drive system 40 for providing the necessary drive signals to the transducer beams 16 and 18 is described. In the depicted embodiment, beam 16 is the master beam, and beam 18 is the secondary beam. The drive system 40 includes an oscillator 42 that generates an output signal that varies with changes in the mechanical resonant frequency of the transducer 12. Oscillator 42 includes two inverting operational amplifiers 44 and 46 and the master beam 16. The master beam 16 is connected between the output of amplifier 44 and the input of amplifier 46, and the output signal of amplifier 46 is applied to amplifier 44 to form a feedback network. A resistor 50 and a capacitor 52 are connected across amplifier 46 to stabilize the frequency and voltage level of the signals produced by oscillator 42. Resistor 50 is depicted as a variable resistor that can be adjusted to control the voltage level of the oscillator circuit 42. The output signal of oscillator 42 may be taken off a buffer amplifier 54 connected to receive the output of amplifier 46. Buffer amplifier 54 isolates oscillator circuit 42 from the effects of nearby signals from the system in which sensor 10 and drive circuit 40 are used.

The output of oscillator 42 is applied to a drive amplifier circuit 56 that controls the amplitude and phase of the drive signal applied to the secondary beam 18. The depicted drive amplifier circuit 56 is used to apply a drive signal to secondary beam 18 that is 180° out of phase with the drive voltage applied to the master beam 16. The gain of the output drive voltage of drive amplifier circuit 56 depends on the relative magnitude of the isolated resonant frequencies of the beams 16 and 18.

When the isolated resonant frequency of secondary beam 18 is less than the isolated resonant frequency of the master beam 16, drive amplifier circuit 56 is used to apply an amplified voltage to the secondary beam. When the isolated resonant frequency of secondary beam 18 is greater than the isolated resonant frequency master beam 16, an attenuated voltage is applied to the secondary beam.

Drive amplifier circuit 56 of FIG. 2 is used for applying an amplified voltage to secondary beam 18. The drive amplifier circuit 56 includes a single non-inverting operational amplifier 58 which receives output signals from oscillator 42 through the positive input to the amplifier. A resistor 60 is connected between the negative input of amplifier 58 and ground, and a resistor 62 provides feedback from the output of the amplifier to the negative input. The resistances of resistors 60 and 62 are selected such that resistor 62 has a higher resistance than resistor 60 so that the drive voltage applied to secondary beam 18 is greater than the drive voltage applied to master beam 16. In the depicted embodiment, resistor 62 is a variable resistor to control the amplitude of the drive voltage applied to the secondary beam 18.

Figure 3:
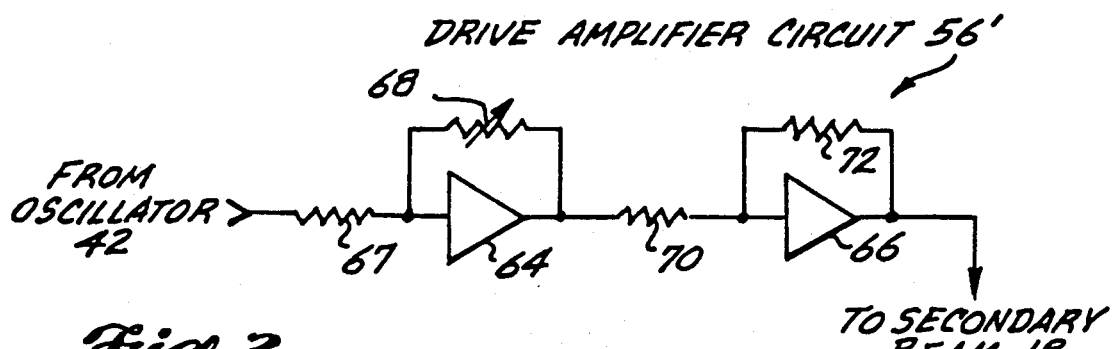
FIG. 3 is a schematic diagram depicting an alternative embodiment of a drive amplifier circuit for producing a secondary beam drive voltage that can be used with the drive system of FIG. 2.

FIG. 3 illustrates an alternative drive amplifier circuit 56' used to provide an attenuated drive voltage to the secondary beam 18. Drive amplifier circuit 56' includes two series-connected inverting amplifiers 64 and 66. Amplifier 64 receives output signals from the oscillator 42 through a resistor 67 through the negative input to the amplifier. A resistor 68 provides feedback from the output of amplifier 64 to the negative input of the amplifier. The resistance of resistors 67 and 68 are selected such that resistor 67 has a higher resistance than resistor 68 so that the voltage out of amplifier 64 will be less than the output voltage of the oscillator 42. In the depicted embodiment, resistor 68 is a variable resistor to control the amplitude of the drive voltage generated by amplifier 64. The output of amplifier 64 is applied to amplifier 66 through a resistor 70 through the negative input to the amplifier 66. A resistor 72 provides feedback from the output of amplifier 66 to the negative input of the amplifier. Resistors 70 and 72 have identical resistances so that amplifier 66 functions as a unity-gain amplifier. Amplifier 66 thus serves to invert the output from amplifier 64 so that the final output voltage from drive amplifier circuit 56' is in phase with the input voltage.

When the drive system 40 is used to energize the transducer 12, the oscillator 42 generates a signal at the resonant frequency of the master beam 16. The output signal of the oscillator 42 is applied to the drive amplifier circuit 56. The output signal from drive amplifier circuit 56 is applied to the secondary beam 18. In the first depicted embodiment, the amplified drive signal causes the secondary beam to be driven off its preferred isolated individual resonance and onto vibrations that are at the same frequency and amplitude as the vibrations of the master beam 16. The signal applied to the secondary beam 18 from drive amplifier circuit 56 is 180° out of phase with the drive signal applied to the master beam. Consequently, beams 16 and 18 will vibrate at the same frequency and amplitude and in phase, which are the ideal conditions for minimizing energy transfer to the adjacent mounting structure and maximizing the quality factor of the transducer 10.

In one embodiment of the invention, transducer 12 is designed to resonate at a frequency between 30 and 40 kHz and master beam 16 has the higher isolated resonant frequency. To force the secondary beam 18 to vibrate in synchronization with, and at the same frequency and amplitude as the master beam 16, the drive voltage applied to the secondary beam should be no more than ten times the drive voltage applied to the master beam. The actual ratio of the voltages will, of course, vary depending on a number of variables, including: the type of crystal used to form the transducer 12; resonant frequency of the transducer 12; and, the difference in resonant frequencies between the beams 16 and 18.

When the secondary beam 18 has a higher isolated individual resonant than that of the master beam 16, drive amplifier circuit 56' is used to apply an attenuated signal to the secondary beam 18. The attenuated signal under-drives beam 18 so that the beams 16 and 18 will vibrate in phase at the same frequency and amplitude of the master beam 16. The force and torque end reactions of the beams 16 and 18 will cancel, reducing energy loss to the surrounding structure and improving the quality factor of the transducer 12.

Figure 4A:
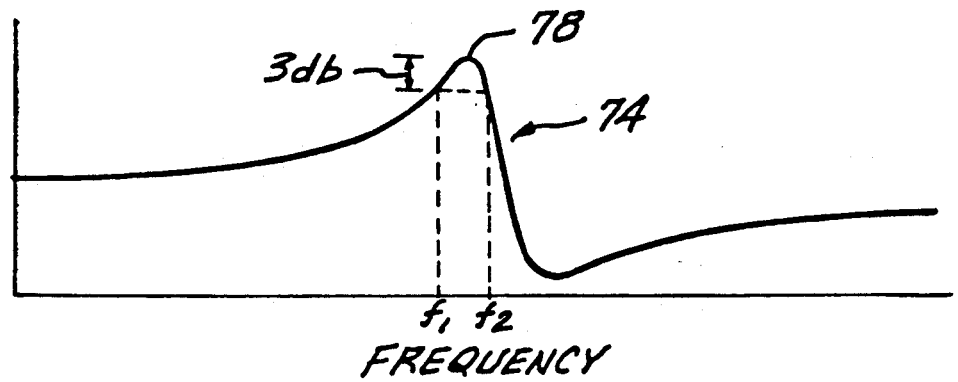
FIG. 4A is a graphic representation of the resonant frequency of the vibrating beam transducer when a common voltage is applied to both beams.
Figure 4B:
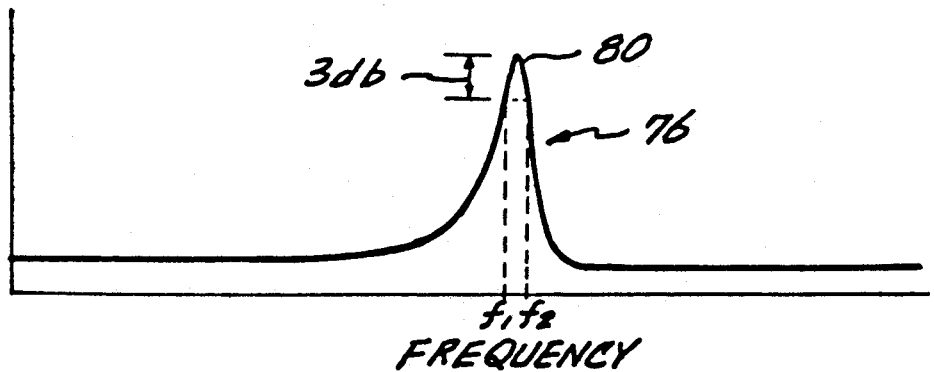
FIG. 4B is a graphic representation of the resonant frequency of a vibrating beam transducer wherein the individual transducer beams are individually excited by separate drive voltages.

FIGS. 4A and 4B graphically depict the difference between driving the transducer beams 16 and 18 at a constant voltage versus applying a separate drive voltage to each beam 16 and 18. Each figure depicts a frequency response or resonant curve, curves 74 and 76 respectively, for the master beam 16. The curves 74 and 76 depict the operation of the transducer 12 in a range of 30 to 45 kilohertz and, more specifically, a specific frequency spectrum within that range of 0.2 kilohertz. Curve 74 of FIG. 4A depicts the frequency response when a common signal is applied to the beams 16 and 18. The quality factor of the transducer 12, as graphically depicted by the relatively wide frequency spectrum three dB below the resonant frequency of the curve 54 represented by point 78, is relatively low.

As depicted by curve 76 of FIG. 4B, when the beams 16 and 18 are provided with separate drive signals from drive system 40, the admittance of the transducer 12 at the resonant frequency indicated by point 80 increases and the range of frequencies 3dB below the resonant frequency narrows, resulting in a substantially increased quality factor. This is because when the beams 16 and 18 vibrate they do so at common frequency near the resonant frequency of one of the beams 16 and 18 and have vibrations that are in phase and are of equal magnitude. Energy loss from the beams through the mounting pads 20 and 22 is significantly reduced, so that the admittance at the resonant frequency increases, which increases the quality factor of the transducer 12. The increased quality factor improves the frequency stability of the transducer 12 which enhances the definition of the force-induced frequency changes on which the force measurements are based. Consequently, the force measurements provided by transducer 12 are of greater accuracy.

Moreover, the drive system 40 always applies a drive signal to the secondary beam 18 at the instantaneous resonant frequency of the master beam 16. This ensures that the secondary beam 18 is always driven into the resonance of the master beam 16 even when the transducer 12 is stressed and the resonant frequency of the beams changes. Thus, the overall accuracy of force changes that are measured by the transducer as a function of frequency changes is further enhanced.

When using the drive system 40 of this invention to adjust for differences between the resonant frequencies of the beams, it is necessary to determine which beam 16 or 18 has a higher resonant frequency for purposes of serving as the master beam. One method of determining the relative magnitude of the isolated resonant frequencies of beams 16 and 18 is by experimentation using drive system 40. The resonant frequency voltage from each beam can be amplified and applied to the other beam. Impedance analyzation techniques or gain phase analysis methods known in the art are then used to obtain the quality factor of the transducer when each beam 16 or 18 is used as the master beam. The configuration wherein the quality factor of the transducer 12 is the greatest is the one wherein the higher resonant frequency beam 16 or 18 is being correctly used as the master beam to control the frequency of the drive voltage applied to the secondary beam 18 or 16.

It should be noted that while this drive system 40 works well for correcting some differences in the resonant frequencies between the beams 16 and 18, it may not work well for correcting large differences between the resonant frequencies. This invention may not be capable of significantly correcting natural resonant frequency differences between the beams of 3% or more; may only be of modest effectiveness for correcting differences of over 1% and is most clearly effective when the natural frequency differences are less than 1%.

The foregoing description has been limited to a specific embodiment of this invention. It will be apparent, however, that the invention can be practiced in systems having diverse basic constructions or with alternative forms of drive systems with some or all of the advantages of this invention. For example, drive systems to drive the secondary beam 18 with respect to the resonant frequency of the master beam 16 can readily be provided by alternatives to the described circuit. Variable resistors 50, 60 and 68 may be programmable resistors, or multitap resistors, or other types of variable resistors depending on the specific design of the drive system 40. In other embodiments of the invention, it may be desirable to drive both beams with respect to a common frequency that is in between the inherent natural frequencies of the individual beams. In some embodiments of the invention the drive system may operate by applying drive signals at separate frequencies to the individual beams in order to improve the quality factor of the transducer. In other embodiments of the invention, the drive signals may have identical voltage but have different currents. In still other embodiments of the invention, the drive system may operate by applying signals that have the same frequency and amplitude, but are out of phase with each other, to the individual beams.

The described and depicted force sensor 10 is used to measure acceleration. It is understood that the drive system 40 of this invention can be used with any other type vibrating transducer-sensor that has a resonant frequency that varies as function of changes in the measured parameter. For example, the drive system 40 can be used with vibrating crystals that measure pressure or weight as a function of force applied thereto. Alternatively, it is readily apparent that the drive system 40 and method of this invention can be used to excite multiple vibrating beam transducers used to measure other, nonforce related, parameters. For example, this invention can be used to excite multi-beam vibrating transducers that are used to measure temperature which is another environmental condition that can effect the resonant frequency of the transducer. Therefore, it is the object of the appended claims to cover all such modifications and variations as come within the true spirit and scope of the invention.

What is claimed as new and is desired to be secured by Letters Patent of the United States is:

1. A sensor assembly comprising:
   (a) a vibrating transducer having two mechanically coupled vibrating beams, each of said beams having a separate isolated resonant frequency; and
   (b) a drive system for applying different drive signals to said beams so that when said different drive signals are applied, said transducer has a quality factor greater than when the same drive signal is applied to both beams.

2. The sensor of claim 1 wherein said drive signals are applied to said beams so that said beams vibrate at a single resonant frequency closer to said isolated resonant frequency of one of said beams than to the resonant frequency of said beams when a single drive signal is applied to said beams.

3. The sensor of claim 1 wherein said beams include a master beam and a secondary beam, said drive system applies a drive signal to said secondary beam such that said secondary beam resonates at approximately said isolated resonant frequency of said master beam.

4. The sensor assembly of claim 3 wherein said drive system applies a first signal to said master beam so as to cause the oscillation thereof at said isolated resonant frequency thereof, and further applies a second signal at the aforesaid isolated resonant frequency to said secondary beam, said second signal at a different voltage level than said first signal.

5. The sensor assembly of claim 3 wherein said assembly comprises an oscillator circuit including said master beam, and a drive amplifier means for receiving the output of said oscillator circuit at a given oscillator output voltage and amplifying same to produce a second signal having second voltage, and a means for applying said second signal to said secondary beam.

6. The sensor assembly of claim 1 further including the difference in isolated frequencies between said beams being less than three percent.

7. The sensor assembly of claim 1 wherein the differences in isolated resonant frequencies between said beams is less than one percent.

8. The sensor assembly of claim 1 wherein said drive signals are applied to said beams at a common frequency.

9. The sensor assembly of claim 4 wherein said second signal applied by said drive system applied to said secondary beam is 180° out of phase with said first signal applied to said master beam.

10. The sensor assembly of claim 5 wherein said oscillator circuit and said drive amplifier means are arranged so that said second voltage is 180° out of phase with said oscillator output voltage.

11. The sensor assembly of claim 4 wherein said master beam is said beam with the highest isolated resonant frequency of said beams, and said second signal applied by said drive system has a greater voltage than the voltage of said first signal.

12. The sensor assembly of claim 4 wherein said master beam is said beam with the lowest isolated resonant frequency of said beams, and said second signal applied by said drive system has a lesser voltage than the voltage of said first signal.

13. The sensor assembly of claim 10 wherein said master beam is said beam with the highest isolated resonant frequency of said beams, and said second voltage generated by said drive amplifier means is greater than said oscillator output voltage.

14. The sensor assembly of claim 10 wherein master beam is said beam with the lowest isolated resonant frequency of said beams, and second voltage produced by said drive amplifier means is less than said oscillator output voltage.

15. The sensor assembly of claim 1 wherein said different drive signals applied by said drive system to said beams are out of phase with each other.

* * * * *